(12) United States Patent
Swig et al.

(10) Patent No.: US 11,929,911 B2
(45) Date of Patent: *Mar. 12, 2024

(54) SHAPING OUTGOING TRAFFIC OF NETWORK PACKETS IN A NETWORK MANAGEMENT SYSTEM

(71) Applicant: NOMADIX, INC., Woodland Hills, CA (US)

(72) Inventors: Allen Martin Swig, Moorpark, CA (US); Vadim Olshansky, Tarzana, CA (US)

(73) Assignee: NOMADIX, INC., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,262

(22) Filed: Oct. 5, 2022

(65) Prior Publication Data
US 2023/0246944 A1 Aug. 3, 2023

Related U.S. Application Data

(63) Continuation of application No. 16/882,101, filed on May 22, 2020, now Pat. No. 11,509,566, which is a (Continued)

(51) Int. Cl.
*H04L 45/02* (2022.01)
*H04L 47/70* (2022.01)

(52) U.S. Cl.
CPC .......... *H04L 45/04* (2013.01); *H04L 47/822* (2013.01)

(58) Field of Classification Search
None
See application file for complete search history.

(56) References Cited

U.S. PATENT DOCUMENTS 5,748,629 A 5/1998 Caldara et al.
6,438,106 B1 8/2002 Pillar et al.
(Continued)

FOREIGN PATENT DOCUMENTS

CA 2366781 C 9/2007

OTHER PUBLICATIONS

Allalouf et al., "A Comparison of token-bucket based Multi-Color Marking Techniques," Proceedings of CoNEXT'06 2nd Conference on Future Networking Technologies, Dec. 4-7, 2006, ADETTI/ISCTE, Lisboa, Portugal, 6 pages.
(Continued)

*Primary Examiner* — Anh Ngoc M Nguyen
(74) *Attorney, Agent, or Firm* — Morrison & Foerster LLP (57) ABSTRACT

A network management system can include multiple network interfaces. For example, the network management system can include a first network interface that can receive a stream of network packets associated with users. The network management system can include a second network interface for transmitting the received stream of network packets. The network management system can shape the stream of network packets before transmission. The network management system can assign the network packets into classes. The classes may have a configured hierarchical relationship. The classes may also have an operational hierarchy based on bandwidth usage during operation. The network management system can shape the stream of network packets based on operational hierarchy of classes and configured hierarchical relationship.

18 Claims, 11 Drawing Sheets

Related U.S. Application Data continuation of application No. 15/497,919, filed on Apr. 26, 2017, now Pat. No. 10,666,545, which is a continuation of application No. 14/880,099, filed on Oct. 9, 2015, now Pat. No. 9,641,424.

(60) Provisional application No. 62/062,765, filed on Oct. 10, 2014, provisional application No. 62/094,894, filed on Dec. 19, 2014.

(56) References Cited

U.S. PATENT DOCUMENTS

| | | | |
|---|---|---|---|
| 6,567,408 | B1 | 5/2003 | Li et al. |
| 6,865,185 | B1 | 3/2005 | Patel et al. |
| 6,917,591 | B2 | 7/2005 | St. John |
| 6,977,930 | B1 | 12/2005 | Epps et al. |
| 7,085,247 | B2 | 8/2006 | Schweinhart et al. |
| 7,099,330 | B2 | 8/2006 | Chiussi et al. |
| 7,382,727 | B2 | 6/2008 | Yang |
| 7,457,313 | B2 | 11/2008 | Patrick |
| 7,675,890 | B2 | 3/2010 | Wang |
| 7,742,499 | B1 | 6/2010 | Erskine et al. |
| 7,756,037 | B2 | 7/2010 | Oren et al. |
| 7,826,358 | B2 | 11/2010 | Caram |
| 7,908,393 | B2 | 3/2011 | Marr et al. |
| 8,681,614 | B1 | 3/2014 | Mccanne et al. |
| 9,641,424 | B1 | 5/2017 | Swig et al. |
| 9,713,167 | B2 | 7/2017 | Kakadia et al. |
| 10,666,545 | B2 | 5/2020 | Swig et al. |
| 11,509,566 | B2 * | 11/2022 | Swig ................ H04L 47/822 |
| 2001/0030970 | A1 | 10/2001 | Wiryaman et al. |
| 2002/0010772 | A1 | 1/2002 | Kusano |
| 2002/0103895 | A1 | 8/2002 | Chiang |
| 2003/0099200 | A1 | 5/2003 | Kiremidjian et al. |
| 2003/0152096 | A1 | 8/2003 | Chapman |
| 2004/0028054 | A1 | 2/2004 | Khurana et al. |
| 2004/0100903 | A1 | 5/2004 | Han et al. |
| 2004/0257994 | A1 | 12/2004 | Paskett et al. |
| 2005/0094643 | A1 | 5/2005 | Wang et al. |
| 2005/0175014 | A1 | 8/2005 | Patrick |
| 2005/0249220 | A1 * | 11/2005 | Olsen ................ H04L 47/326 370/235 |
| 2006/0101144 | A1 * | 5/2006 | Wiryaman ........... H04L 45/745 709/225 |
| 2006/0165103 | A1 | 7/2006 | Trudeau et al. |
| 2006/0187949 | A1 | 8/2006 | Seshan et al. |
| 2006/0221978 | A1 | 10/2006 | Venkatachalam |
| 2007/0041390 | A1 | 2/2007 | Tatar et al. |
| 2010/0098414 | A1 | 4/2010 | Kramer et al. |
| 2011/0007687 | A1 | 1/2011 | Howe et al. |
| 2011/0201307 | A1 | 8/2011 | Segura |
| 2013/0301412 | A1 | 11/2013 | Weiss et al. |
| 2013/0336229 | A1 | 12/2013 | Kakadia et al. |
| 2014/0269292 | A1 | 9/2014 | Kalkunte et al. |

OTHER PUBLICATIONS

Brown et al., "Traffic Control HOWTO" Guide to IP Layer Network 49 (2006). 36 pages.
Bucur et al., "Network traffic optimizing algorithms in Linux." Annals of DAAAM & Proceedings. (2009): 7 pages.
"Converging the Data Network with VoIP Fundamentals" Nortel Communication Server 1000. Release 6.0, Publication: NN43001-260. Document release date: Mar. 3, 2010. 462 pages.
Deka, Kaushik, "Predictive Bandwidth Provisioning from Temporal Network Measurements." PhD diss., Computer Science Telecommunications Program. University of Missouri—Kansas City, 2000, 82 pages.
Devera, Martin, "HTB Linux Queuing Discipline Manual—User Guide", 2002, pp. 8, http://luxik.cdi.cz/~devik/qos/htb/userg.pdf.
Extreme Networks, "Policy Based Quality of Service for Enterprise LANs", http://www.csd.uoc.gr/~hy536/PB.pdf, 2000, p. 16.
Final Office Action dated Dec. 7, 2021, for U.S. Appl. No. 16/882,101, filed May 22, 2020, fifteen pages.
H3C, "09-ACL and QoS Configuration Guide", http://www.h3c.com/portal/TechnicalSupprtDocuments/TechnicalDocuments/Routers/H3CSR8800SeriesRoutersLConfiguration/OperationManual/H3CSR8800CG-Release3347-6WI03/09/201211/76192412850.htm , as printed Oct. 21, 2014 in 27 pages.
Heinanen, et al., "A Single Rate Three Color Marker" Network Working Group, University of Pennsylvania, Sep. 1999, 6 pages.
Hubert, et al., "Linux Advanced Routing & Traffic Control HOWTO," https://lartc.org/lartc.pdf , May 19, 2012.
Kukard, et al., "Bandwidth Management and Optimization" International Network INASP, Opensource Bandwidth Solutions, Mar. 2006, 203 pages.
Lenzini, et al., "Aliquem: a Novel DRR Implementation to Achieve Better Latency and Fairness at 0(1) Complexity," 2002 Tenth IEEE International Workshop on Quality of Service, pp. 77-86.
Lenzini, et al., "Performance analysis of Modified Deficit Round Robin schedulers," Journal of High Speed Networks 16 (2007), pp. 399-422.
Microtik, "Bandwidth Control," https://mikrotik.com/testdocs/ros/3.0/qos/queue.php , Nov. 28, 2007.
Moltchanov, D.,. "Automatic bandwidth adjustment for content distribution in MPLS networks." Adv. MultiMedia 2008, 2, Article 3 (Jan. 2008), 15 pages. "Converging the Data Network with VoIP Fundamentals" Nortel Communication Server 1000. Release 6.0, Publication: NN43001-260. Document release date: Mar. 3, 2010. 462 pages.
Non-Final Office Action dated May 17, 2021, for U.S. Appl. No. 16/882,101, filed May 22, 2020, nine pages.
Notice of Allowance dated Jul. 7, 2022, for U.S. Appl. No. 16/882,101, filed May 22, 2020, eight pages.
OpenBSD, "PF: Packet Queueing and Prioritization", http://web.archive.org/web/20141025232725Lhttp://www.openbsd.org/faq/pf/queueing.html , as captured Oct. 25, 2014 in 10 pages.
Ramachandran, et al. "Fair resource allocation in active networks," in Proceedings Ninth International Conference on Computer Communications and Networks (Cat.No. 00EX440), Las Vegas, NV, USA, 2000, pp. 468-475.
Ravichandiran, et al. "Analysis, Modification, and Implementation (AMI) of Scheduling Algorithm for the IEEE 802.116e (Mobile WiMAX)" in International Journal of Computer Science and Information Security, IJCSIS, vol. 7 No. 2, Feb. 2010, pp. 94-103.
Shreedhar, et al., "Efficient Fair Queuing Using Deficit Round Robin", SIGCOMM '95, Aug. 1, 1995, pp. 231-242.
Valenzuela, et al., "A Hierarchical Token Bucket Algorithm to Enhance QoS in IEEE 802.11:Proposal, Implementation and Evaluation", IEEE Semiannual Vehicular Technology Conference (VTC 2004-Fall), Los Angeles (USA), Sep. 26-29, 2004, http://grcm.tsc.upc.edu/sites/default/files/htb_vtc04-fall.pdf.

* cited by examiner

| Classes | WAN root (100Mbs) | | | |
|---|---|---|---|---|
| | demand | Class min | Class max | actual |
| A (priority 1) | 100Mbs | 25Mbs | 100Mbs | 75Mbs |
| B (priority 2) | 100Mbs | 25Mbs | 100Mbs | 25Mbs |

FIG. 5B

| Classes | WAN root (100Mbs) | | | |
|---|---|---|---|---|
| | demand | Class min | Class max | actual |
| A (priority 1) | 100Mbs | 25Mbs | 60Mbs | 60Mbs |
| B (priority 2) | 100Mbs | 25Mbs | 60Mbs | 40Mbs |

FIG. 5C

| Classes | WAN root (100Mbs) | | | |
|---|---|---|---|---|
| | demand | Class min | Class max | actual |
| A (priority 1) | 100Mbs | 25Mbs | 60Mbs | 50Mbs |
| B (priority 1) | 100Mbs | 25Mbs | 60Mbs | 50Mbs |

| Root Max: 40Mbs | | | | |
|---|---|---|---|---|
| Class Hi Priority 1 Min 30Mbs Max 40Mbs | | Class Low Priority 2 Min 10Mbs Max 40Mbs | | |
| Hi.A | Hi.B | Low.A | Low.B | Class |
| 1 | 2 | 1 | 2 | Priority |
| 40Mbs | 40Mbs | 40Mbs | 40Mbs | demand |
| 0Mbs | 1Mbs | 0Mbs | 1Mbs | min |
| 40Mbs | 40Mbs | 40Mbs | 40Mbs | max |
| 29Mbs | 1Mbs | 9Mbs | 1Mbs | acutal |

SHAPING OUTGOING TRAFFIC OF NETWORK PACKETS IN A NETWORK MANAGEMENT SYSTEM

RELATED APPLICATIONS

Incorporation by Reference to any Priority Applications

This application is a continuation of U.S. application Ser. No. 16/882,101, filed May 22, 2020 and titled "SHAPING OUTGOING TRAFFIC OF NETWORK PACKETS IN A NETWORK MANAGEMENT SYSTEM," which is a continuation of U.S. application Ser. No. 15/497,919, filed Apr. 26, 2017 and titled "SHAPING OUTGOING TRAFFIC OF NETWORK PACKETS IN A NETWORK MANAGEMENT SYSTEM," which is a continuation of U.S. application Ser. No. 14/880,099, filed Oct. 9, 2015 and titled "SHAPING OUTGOING TRAFFIC OF NETWORK PACKETS IN A NETWORK MANAGEMENT SYSTEM," which claims priority to U.S. Provisional Application No. 62/062,765, filed Oct. 10, 2014 and titled "CLASS BASED QUEUEING," and U.S. Provisional Application No. 62/094,894, filed Dec. 19, 2014 and titled "CLASS BASED QUEUEING," the disclosure of each of which is hereby incorporated by reference in its entirety. Any and all applications for which a foreign or domestic priority claim is identified in the Application Data Sheet as filed with the present application are incorporated by reference under 37 CFR 1.57 and made a part of this specification.

BACKGROUND

The disclosure relates to routing network traffic using a network management system. A network management system can be used to provide access to a network, such as the Internet, to multiple users. Some types of network management systems can be used to provide access to hundreds or thousands of different users and their corresponding network capable user devices. Network management systems can be used to control internet access in public and private venues. A network management system can have limited bandwidth to share among its users. At a given time, network management systems may manage hundreds or thousands of user devices requesting content from the intent.

SUMMARY

In an embodiment, the network management system can include a first network interface for receiving a plurality of network packets associated with a plurality of user devices in a first order. The network management system can include a second network interface for transmitting the plurality of network packets associated with the plurality of user devices in a second order. The network management system can include a hardware processor and a memory. In some embodiments, the hardware processor can implement a control system. The control system can classify a first network packet corresponding to a first user device to a first class. The control system can classify a second network packet corresponding to a second user device to a second class. The control system can add the first network packet in a first queue of the first class based on the classification of the first network packet with the first class. In some embodiments, the control system can add the second network packet in a second queue of the second class based on the classification of the second network packet with the second class.

The control system can further determine a configured hierarchical relationship of the first class with respect to the second class. In some embodiments, the control system determines a first bandwidth usage indicator of the first class and a second bandwidth usage indicator of the second class. The control system can further determine an operational hierarchical relationship between the first class and the second class based at least in part on the determined first bandwidth usage indicator, the second bandwidth usage indicator, and the configured hierarchical relationship. The control system can identify a transmission class from one of the first or second classes based on the operational hierarchical relationship. In an embodiment, the control system removes a transmission network packet from a current queue of the transmission class.

In an embodiment, a network management system method can shape outgoing traffic of network packets. The method can include classifying a network packet received at a first network interface to a first class. The method can further include adding the network packet in a first queue of a plurality of queues associated with the first class. The method can also include determining a configured hierarchy of a plurality of classes including the first class. In some embodiments, the method can include determining a plurality of bandwidth usage indicators for the plurality of classes. Further, the method can include determining an operational hierarchy of the plurality of classes. The method can also include identifying a transmission class based on the operational hierarchy. In an embodiment, the method can include removing a transmission network packet from the transmission class.

BRIEF DESCRIPTION OF THE DRAWINGS

Embodiments disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIG. 9 illustrates an embodiment of a user interface 900 for assigning a subscriber and their corresponding devices to a particular class.

DETAILED DESCRIPTION

A network management system can implement a bandwidth sharing scheme as described herein. The network management system can be implemented in a hotel. The network management system can manage bandwidth distribution between hundreds of users and their corresponding computing at a given time.

A. Network Management System

Figure 1:
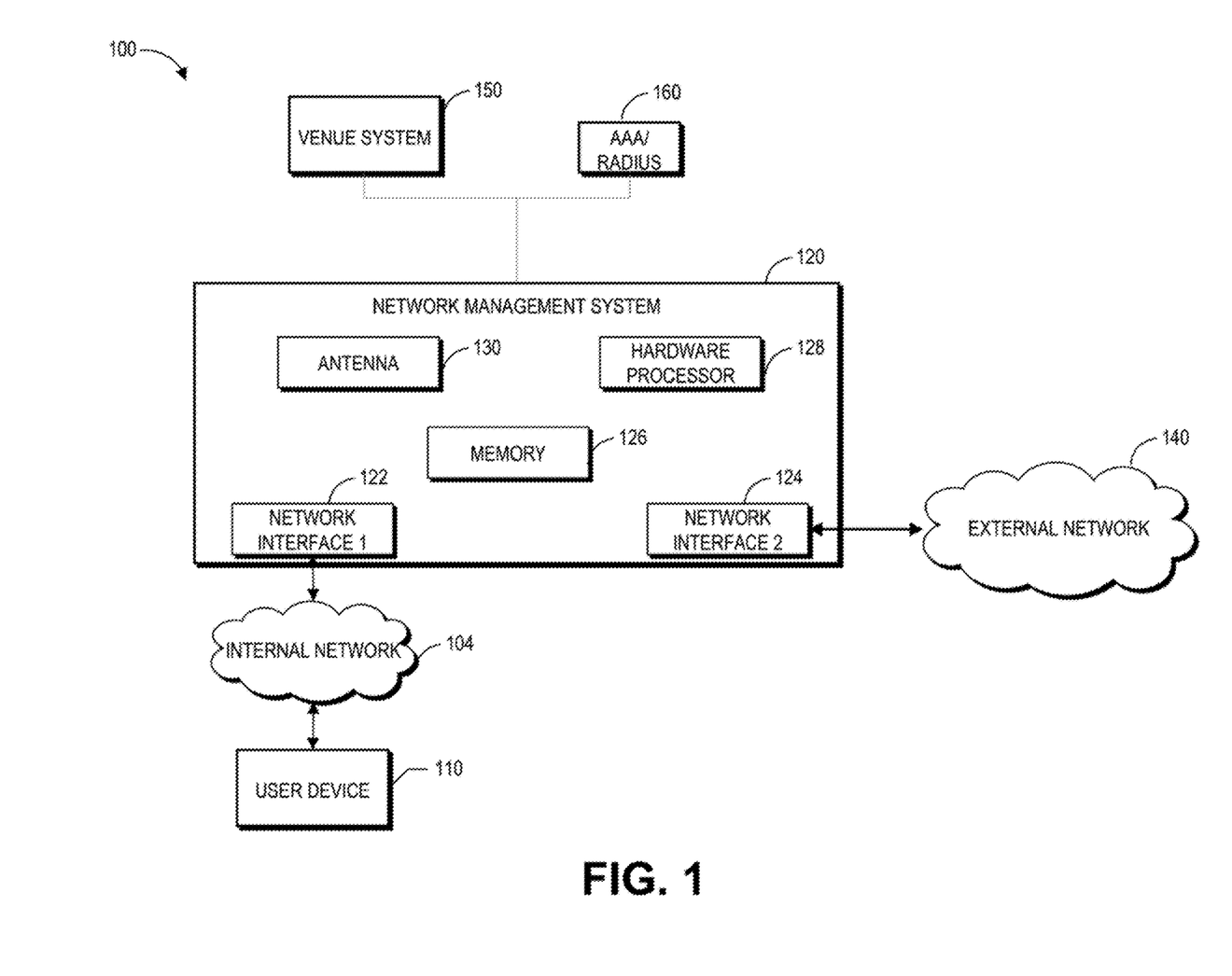
FIG. 1 illustrates an embodiment of a network environment including a network management system for connecting user devices to an external network.

FIG. 1 illustrates an embodiment of a networking system 100 including a network management system 120 for managing connections between a user device 110 on an internal network 104 and an external network 140, such as the internet. The network management system 120 can include multiple hardware components. For example, the network management system 120 can include network interfaces 122 and 124 for receiving and transmitting network packets between an internal network and an external network. The size of the network packets may depend on the protocol or the type of data carried by the network packets. The network management system 120 can include an antenna 130 for receiving and transmitting data over a wireless network. The network management system 120 can include a memory 126 for storing packets and programming instructions that can be executed by a hardware processor 128. In some embodiments, the instructions can be stored in an internal memory of the hardware processor 128. While a single block is shown, the network management system 120 may include multiple hardware devices. In some embodiments, the network management system 120 can include a network gateway. The network management system 120 can also include one or more access points.

Users and user devices may be used interchangeably herein. A user may have one or more user devices associated with them. The user can use the user devices to request connection to an external network. The user devices may include a unique ID (such as a MAC Address Number or SIM card number). Further, users or user devices can also be identified based on membership ID, login ID, credit card information or any other identification parameter.

The network environment 100 can also include a venue system 150 and a AAA/Radius system 160. The venue system 150 may include a computing system that is related to the property where users are request access for access. In an embodiment, the venue system 150 can include a property management system. The AAA/Radius system 160 and/or the venue system 150 can include information about the users that can be used by a control system to determine how to share bandwidth among the users. The information can include loyalty points, class allocation, credit card, user preferences, login information, and the like.

B. Control System

Figure 2:
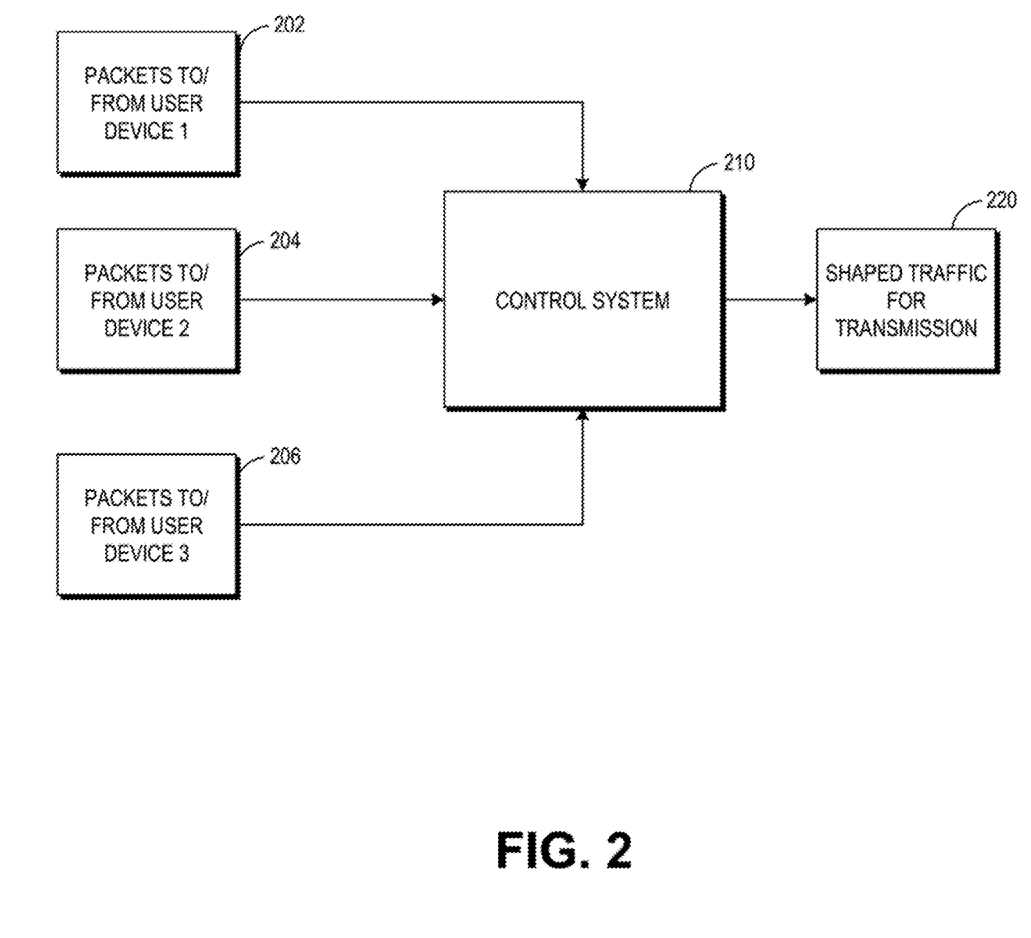
FIG. 2 illustrates an embodiment of control system for managing operation of the network management system.

FIG. 2 illustrates an embodiment of a control system 210 for managing network traffic between the internal and external networks. The control system 220 can include programming instructions corresponding to functions and processes described herein. The programming instructions can be stored in the memory 126. The control system 220 can be executed by the hardware processor 128 of the network management system 120. The programming instructions can be implemented using C, C++, JAVA, or any other suitable programming languages. In some embodiments, some or all of the portions of the control system 220 can be implemented in application specific circuitry, such as ASICs and FPGAs.

The internal network 104 may include multiple user devices 110 requesting connections 202, 204, and 206 with the external network 140. In some instances, user devices 110 may require a large amount of bandwidth for receiving or transmission of video content. These user devices may take up a large portion of the bandwidth for a period of time. Further, the bandwidth corresponding to transmission of data from network interface 124 to the external network may be limited by constraints. In a hotel environment or any other network provider environments (such as coffee shops, shopping centers, airplanes or the like), some users may want a higher connection speed or bandwidth. Accordingly, in some embodiments, the control system 220 can take the incoming traffic of network packets 202, 204, and 206 and dynamically shape an outgoing traffic of network packets 220. As discussed more in detail below, the control system 220 can use a combination of configured relationship and a runtime relationship between the user devices in the internal network to shape the traffic. Outgoing traffic may refer to upload or download of network packets between the internal network 104 and the external network 140. In an embodiment, the control system 210 shapes the traffic by selecting or scheduling packets for transmission at particular time periods.

Users may request a wide variety of content. The size of packets may vary depending on the content. The control system 210 can manage packets of varying size using the processes described herein. In an embodiment, the control system 210 can perform bandwidth sharing without knowing the size of incoming packets. In an embodiment, having a configured minimum and maximum rate can enable the control system 210 to manage a finer level of bandwidth distribution.

Classes

The control system 220 can assign users or user devices into one or more classes. In some embodiments, the control system 220 can have separate classes or class hierarchy structure for each of the network interfaces in the network management system 120. A class can represent one or more attributes that are common among the members associated with that particular class. For example, one type of class may represent all users that are receiving internet for free. Another class may represent priority users. Furthermore, there may be a class for members with honors membership points. Classes can also represent geographical location and/or location within a venue of the user or user devices. Classes may include sub-classes where the sub-classes share an attribute of a parent class along with additional attributes. Accordingly, the control system 220 can create a hierarchical structure of users and user devices using the classes.

Figure 3:
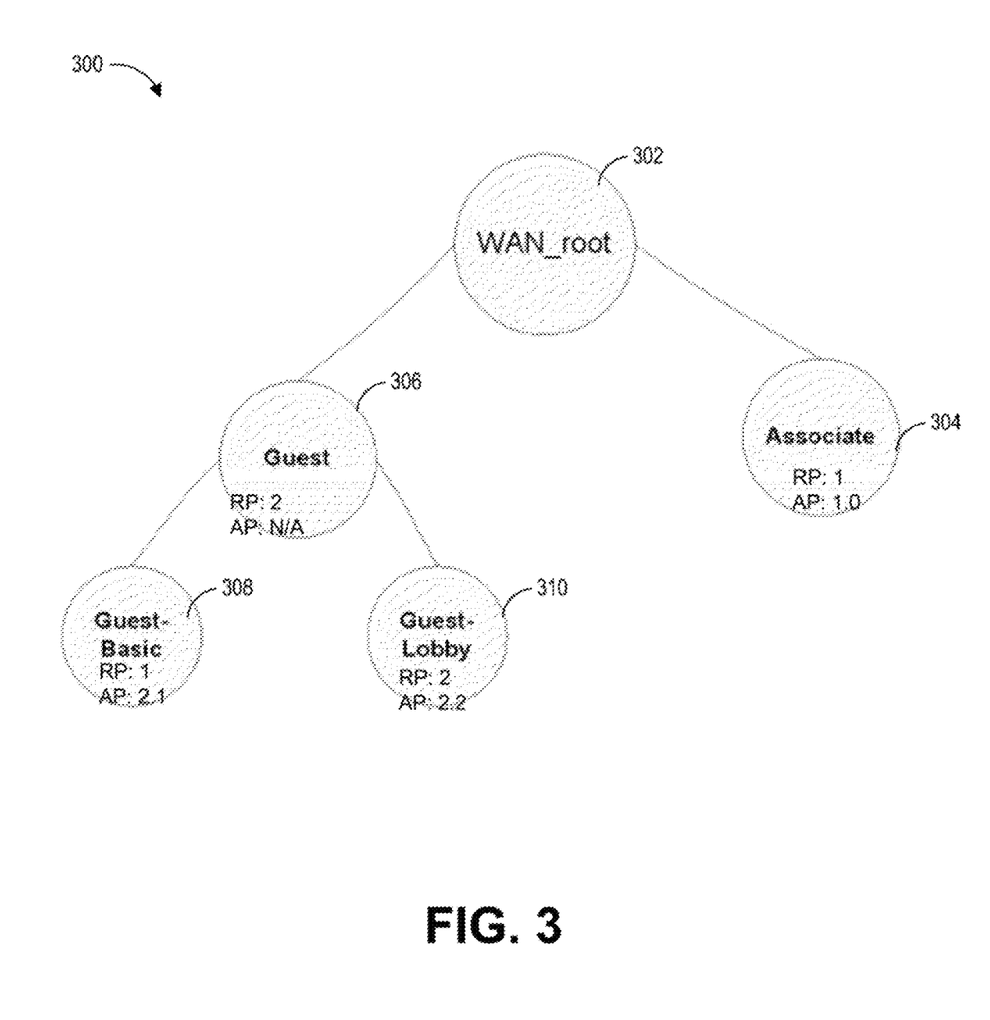
FIG. 3 illustrates an example class structure including relative priority and absolute priority.

A class can include configuration parameters. For example, classes can include name, uplink speed minimum, uplink speed maximum, downlink speed maximum, downlink speed minimum, relative priority, parent (if any). In some embodiments, the control system 210 can create a class hierarchy structure 300 as illustrated in FIG. 3. The class hierarchy structure can include a root class and a default class. In some embodiments, the root class and the default class are automatically created for each WAN port or network interface. The root class can inherit its name and configuration parameters for a particular port based on data stored in the memory 126. Other classes can be defined using the control system 210 and configured by administrators. In some embodiments, a class hierarchy structure can be defined automatically by the control system 210 using a predetermined profile stored in the memory 126.

Each class can have one or more children. The parent-child relationship between classes can be used by the control system 210 to create class hierarchy. The parent child relationship can be created using two configuration parameters: "class name" and "parent". For example, to create a child parent relationship between two classes, the "parent" parameter in the child class can be set to the class name of the parent class. The level of a class can define its depth in the hierarchy. The root class can be considered at level 0, however, the levels are relative with respect to each other. The levels of all other classes can be considered one greater than the level of their respective parent. A class whose level is 1 can be called a top level class. A class with no children is called a leaf class. A top level class can also be a leaf class. The full name of a class can uniquely identify the class.

FIG. 3 illustrates an example hierarchical structure 300 with a root class 302 (name: WAN_root). The root class 302 has two child nodes, guest node 306 (name: WAN_root.Guest, parent:WAN_root) and associate node 304 (name: WAN_root.Associate; parent: WAN_root). The guest node 306 can further include two child nodes, guest-basic 308 (name: WAN_root.Guest.Guest-Basic; parent: WAN_root.Guest) and guest-lobby 310 (name: WAN_root.Guest.Guest-Lobby; parent: WAN_root.Guest). Guest and associate can be top level classes (level 1). Guest-basic, Guest-lobby, and associate can be leaf classes. Guest-basic and Guest-lobby can be considered level 2.

Queues

A class can be considered as a container for storing queues of network packets associated with user devices belonging to users. In some embodiments, the control system 210 can queue packets only in the leaf classes and the intermediate classes can be used to identify hierarchy and run time properties.

The control system 210 can assign a user to a particular class. In an embodiment, the control system 210 assigns a user to a class based on a Radius attribute at the time of login. Users may also be assigned based on other attributes, such as credit card information, loyalty points, geographical location, location in the venue, and the like.

In an embodiment, the control system 210 queues the network packets associated with a user at a leaf class on the egress interface corresponding to the assigned class for the user. If the network packet cannot be classified, the control system 210 can assign it to a default queue or in one of the lower priority classes. The control system 210 can determine a schedule to remove packets from the queue for transmission according to a schedule as discussed below.

C. Configuration Parameters

Configuration parameters can be set by administrators using the control system 210. The configuration parameters can be changed at any time during the operation of the network management system 120.

Bandwidth Parameters

In an embodiment, each class can include four bandwidth parameters. The bandwidth parameters can be expressed as Kbps (kilobits/second). The control system 210 can use these rates to determine when the packets should be removed from queues for transmission from the network interfaces. The parameters can include: uplink speed min, uplink speed max, downlink speed min, and downlink speed max. The uplink speed min can correspond to the minimum rate of service that a class receives, if sufficient demand, for "from subscriber to network" traffic. The uplink speed max can correspond to the maximum rate of service that the class can receive for from "from subscriber to network" traffic. The downlink speed min can correspond to the minimum rate of service that the class receives, if sufficient demand, for "from network to subscriber" traffic. The downlink speed max can correspond to the maximum rate of service that the class should receive for from "from network to subscriber" traffic.

In an embodiment, the control system 220 continuously attempts operates the network management system 120 such that the minimum bandwidth configuration of all classes is met. That is, the minimum bandwidth of a class is greater than or equal to the sum of the minimum bandwidth of all its children. Bandwidth usage can refer to the actual rate, as measured over a time interval, that data or packets is removed from the queue in a class and sent to the interface for transmission. In an embodiment, speed, bandwidth, and throughput may relate to user perceived connection speed.

Relative Priority

Each class can be configured with a relative priority. In an embodiment, top level classes have relative priorities in the range of 1 to 8 and all other classes have a relative priority in the range 1 to 3. Other ranges for relative priorities can also be used. The control system 210 can use the relative priorities to calculate absolute priorities of leaf classes. In an embodiment, the absolute priority of a leaf class is derived from its top level ancestor's relative priority as well as its own relative priority. In an embodiment, the absolute priority of a class is denoted as T.L where T is the configured priority of the top level ancestor of the class and L is 0 if the class itself is a top level class, otherwise L is the configured priority of the class. A class, C1, can be considered to have a higher priority over class, C2 if the absolute priority of the class C1 is less than the absolute priority of class C2. Other methods of tracking priority can also be used by the control system 210. FIG. 3 illustrates configured relative priorities and the derived absolute priorities by the control system 210. The control system 210 may not need to determine priority for the intermediate class.

The control system 210 can arrange or organize packets for transmission by removing them from a queue of a particular class and delivering the packets to the network interface. The control system 210 can perform scheduling independently for each network interface. The control system 210 can select leaf class from which to remove packets to achieve a selected link sharing scheme. In an embodiment, link sharing scheme may refer to achieving a minimum bandwidth guarantee given sufficient demand, maximum bandwidth restrictions, and sharing of excess bandwidth according to priority. The control system 210 can schedule packets based on the derived absolute priority and a runtime priority. As discussed above, the absolute priority can be derived from configuration parameters. The runtime priority or usage priority can be determined by the control system 210 based on bandwidth usage as described more in detail below.

Usage Indicators

In an embodiment, the control system 210 can determine usage indicators for a class as described more in detail below with respect to color indicators. A green color can indicate that a class bandwidth usage is below its configured minimum. A yellow color for a class can indicate that a class bandwidth usage is below its configured maximum and all its ancestors are below their configured minimum. An orange color can indicate that the class bandwidth usage is below its configured maximum and at least one of its ancestors is above its configured minimum. A red color can indicate that bandwidth usage is above the configured maximum for the class or one of the class' ancestors. While the bandwidth usage indicators are described with respect to colors, other types of indicators can also be used by the control system 210. The bandwidth usage indicators can be identified using numbers, alphabets, alpha-numeric, pictorial representations and like.

Figure 4A:
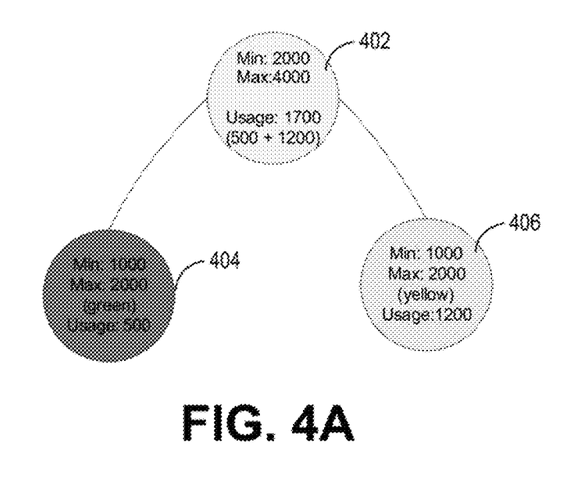
FIGS. 4A-4C illustrate a parent class with two child classes and their corresponding usage indicators.
Figure 4B:
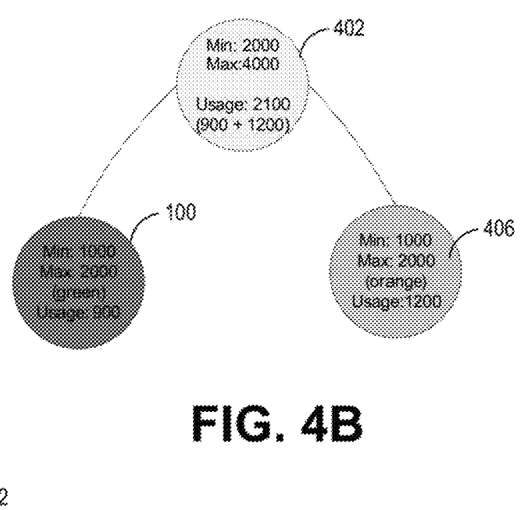
Figure 4C:
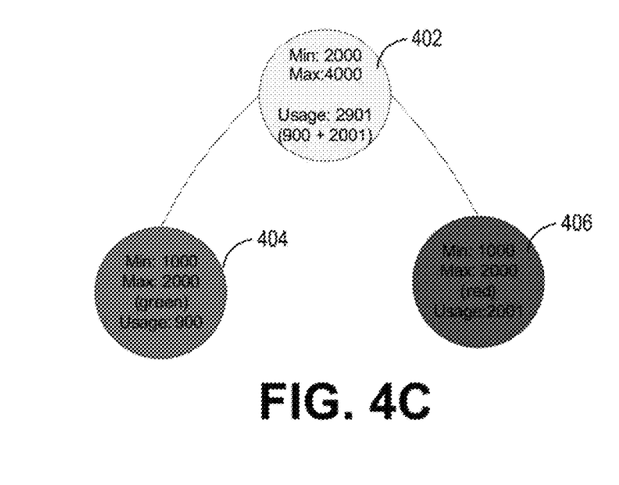

FIGS. 4A to 4C illustrate a parent class 402 including a left child class 404 and a right child class 406. FIG. 4A illustrates that the left child class 404 is using a bandwidth of 500 Kbps as determined by the control system 210, which is less than its configured minimum. Accordingly, the control system 210 identifies the left child class 404 with the green usage indicator. In contrast, the control system 210 identifies the right child class 406 with the yellow usage indicator because the class is using more bandwidth than its configured minimum, but the usage is still below the configured max and its ancestor is below its configured minimum. In FIG. 4B, as the left child 404 uses more bandwidth, the right child 406 becomes orange because now the ancestor 402 goes above the configured minimum. In FIG. 4C, the right child class 406 becomes red as its bandwidth usage exceeds it configured maximum. The left child class 404 still remains green because it is using less than its configured minimum. Accordingly, the control system 210 can dynamically update bandwidth usage indicators as network traffic among the classes change during time. In an embodiment, the control system 210 updates the indicators in the order of microseconds. The update time may vary depending on hardware processing considerations. In some embodiments, bandwidth and connection speed may be used interchangeably as they can be related.

D. Operational Priority

The control system 210 can determine operational priority or runtime priority based on the derived absolute priority and the bandwidth usage indicator. In an embodiment, the control system 210 can determine runtime priority as A.C, where A is the absolute priority and C is the color of the class. The control system 210 can arrange classes into a run time hierarchy based on a combination of absolute priority and bandwidth usage indicator. In one embodiment, green class has a higher priority than yellow, which has higher priority than orange, and orange has higher priority than red. Within the bandwidth usage priority, the control system 210 can order classes based on absolute priorities. A1 may have a higher priority than A2. Accordingly, A1.Green has higher priority than A2.Green. In an embodiment, all classes in red have the same lowest priority regardless of the absolute priority.

E. Scheduling

As discussed above, the control system 210 can schedule packets for transmission based on operational priority or runtime priority. The control system 210 can select the class with the highest runtime priority with respect to other classes. In an embodiment, the control system 210 excludes all classes with a priority of Red. The control system 210 can remove a packet from the queue in the selected class for transmission. Packets may be queued in a particular class based on first in first out. The control system 210 can cause a network interface to transmit the removed packet. The control system 210 can continuously monitor classes to identify the next packet for transmission. Once a packet is removed from a class, the control system 210 can update its bandwidth usage based on the size of the packet. This may result in a change in usage indicator for that class.

For the classes that have the same priority, the control system 210 can use a weighted queuing approach as discussed more in detail below. For example, assume that Class A and Class B have both a usage indicator of yellow and the same absolute priority. Further, assume that Class A has a configured minimum bandwidth of 1000 Kbps and Class B has a minimum bandwidth of 2000 Kbps. Accordingly, Class A and B have the same runtime priority even though they have different configured minimum bandwidth. The control system 210 can take into account the configured minimums when there is a tie between classes in priorities. In an embodiment, the control system 210 selects packets for transmission from these tied classes such that Class B would approximately receive twice the bandwidth of Class A (if they both had sufficient demand) up until the time that their colors differ. The actual bandwidth given to each class over time can vary depending on many factors including size of packets being transmission and frequency of usage indicator changes.

In some embodiments, the systems and methods described herein and the appendices do not require measurement of actual bandwidth. In an embodiment, the packet traffic generated by the network management system as opposed to the subscriber can bypass classification and queueing and the control system 210 can send it directly to the network interface for transmission. System traffic can include WMI, Radius, Syslogs, SNMP, and like.

Figure 5A:
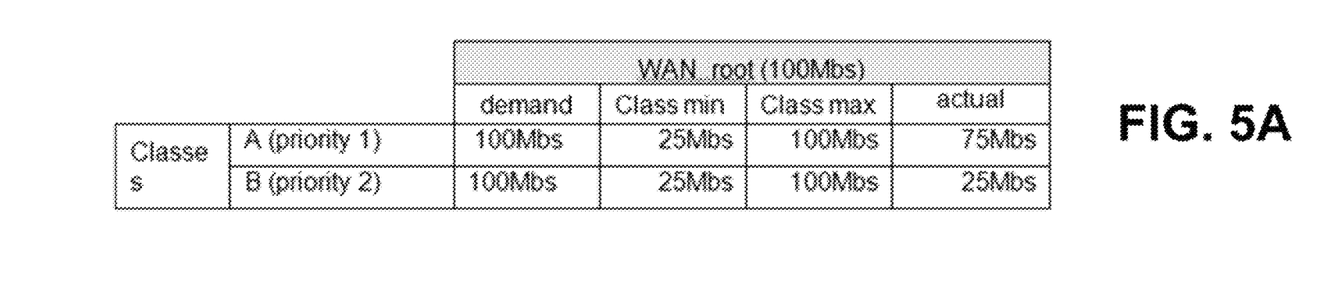
FIGS. 5A-5C illustrate example run time scenarios of bandwidth sharing using the control system.
Figure 5B:
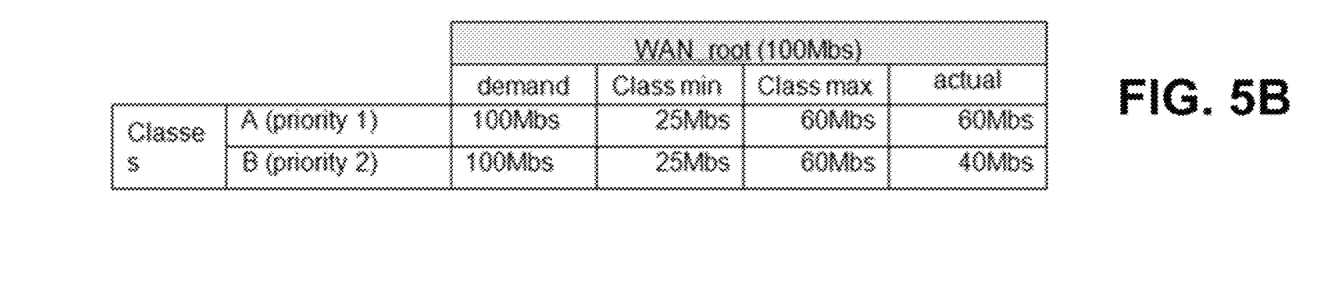
Figure 5C:
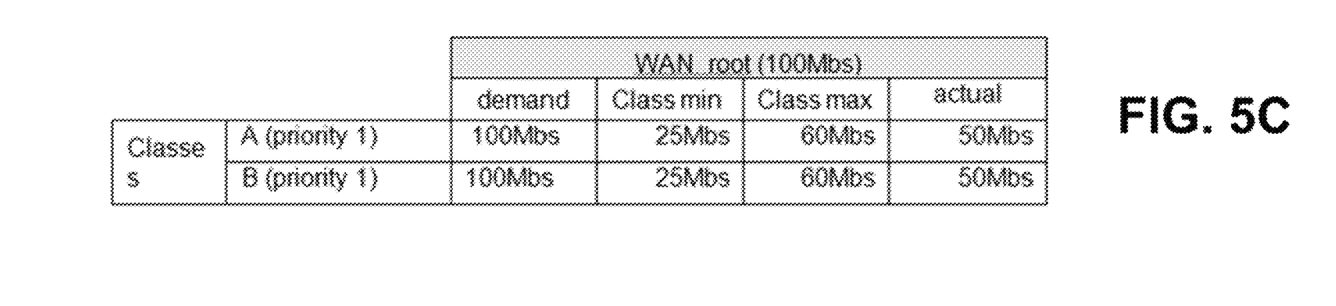

FIGS. 5A-5C illustrate example run time scenarios of bandwidth sharing using the control system 210 and the processes described above. In FIG. 5A, the control system 310 selects packets such that Class A and B can get their minimum bandwidth first and then the excess bandwidth is distributed to Class A since class A has a higher priority than Class B. In FIG. 5B, the control system 310 allocates first the minimum to each class, then up to the max to Class A, and the leftover to Class B. In FIG. 5C, the control system 310 allocates the minimum to Classes A and B, and then the remaining bandwidth is divided equally before of the same priority.

Figure 6:
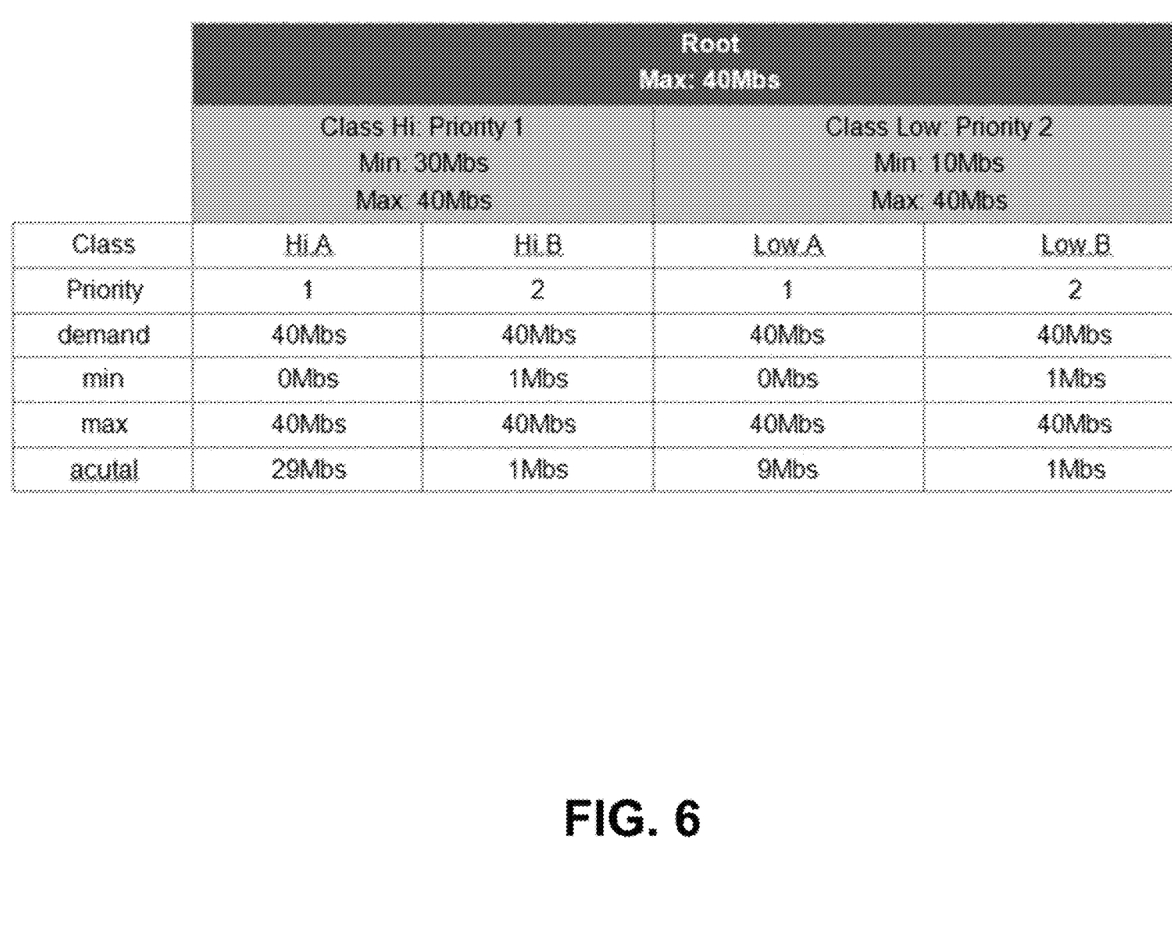
FIG. 6 illustrates an example class hierarchical structure and configuration parameters.
Figure 7:
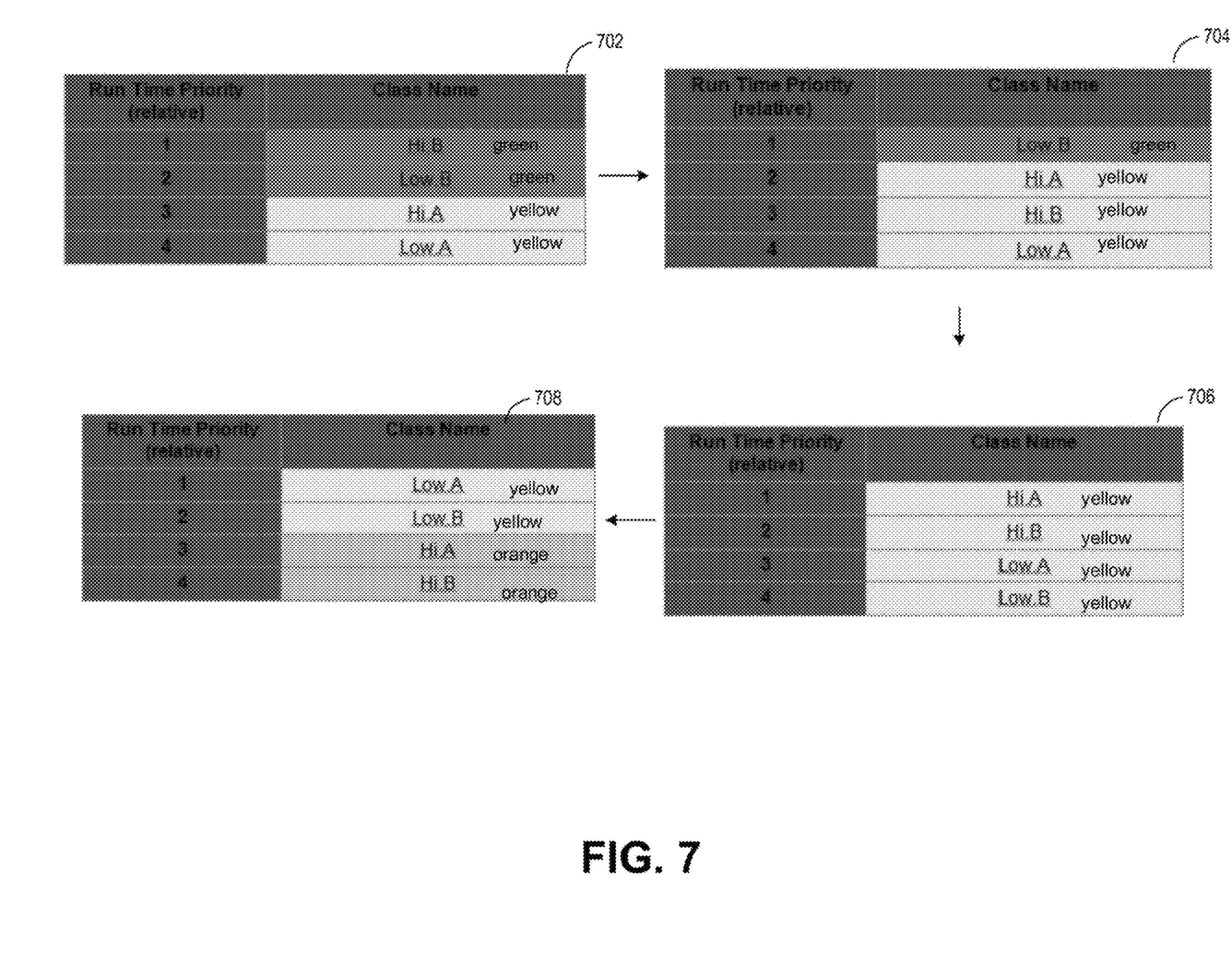
FIG. 7 illustrates the change in run time priorities of the classes illustrated in FIG. 6 over time as the bandwidth usage changes.

FIG. 6 illustrates an example class structure and configuration parameters. FIG. 7 illustrates how the run-time priorities of the various classes of FIG. 6 change with the bandwidth usage. The control system 310 can use the run time priorities to determine distribution of the total available bandwidth. The control system 310 can service the highest priority first. At time 702, Class Hi.A and Hi.B start out yellow (0 Mbs minimum). Hi.B and Low.B are green until they reach their configured minimum bandwidth (1 Mbs). Hi.B is serviced by the control system 210. At block 704, after Hi.B reaches its 1 Mbs configured minimum, Hi.B becomes yellow. The control system 210 services Low.B. At block 706, after Hi.B reaches its 1 Mbs configured minimum, Low.B becomes yellow. The control system 201 services Hi.A. The control system 310 can select packets from class Hi.A until its parent (class Hi) exceeds its bandwidth minimum. Since Hi.B has already consumer 1 Mbs, there is 29 Mbs available for Hi.A. Once the parent (Class Hi) minimum is exceeded, all its children (Hi.A and Hi.B) are transitioned to orange by the control system 210. The control system 210 can then service class Low.A as shown in block 708. Class Low.A can continue to receive service until its parent (class Low) exceeds its bandwidth minimum. Since Low.B has already consumed 1 Mbs, there is 9 Mbs available for Low.A.

Figure 8:
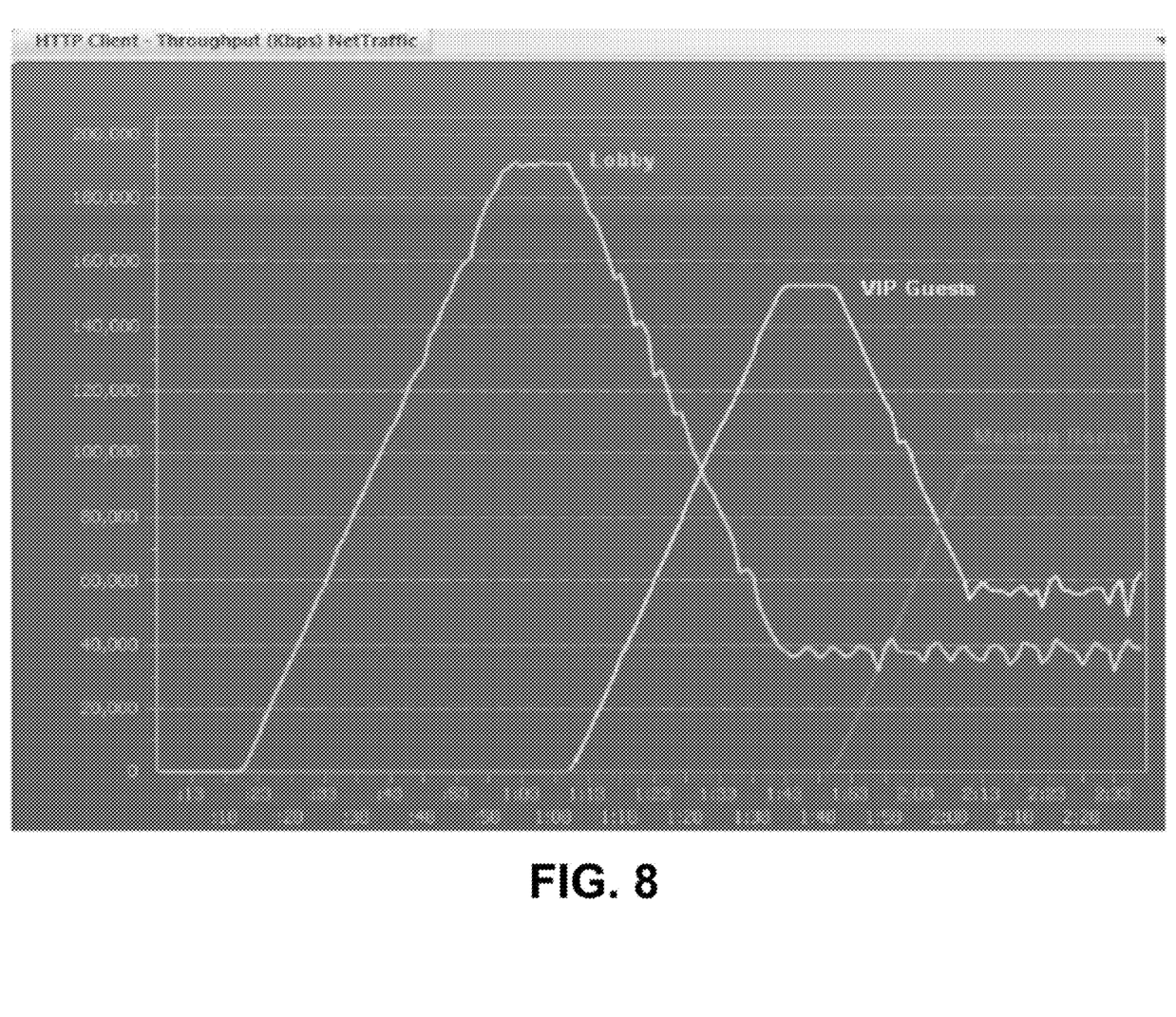
FIG. 8 illustrates an example throughput of classes as bandwidth demands change over time.

FIG. 8 illustrates a measurement of throughput of different classes as bandwidth demands change over time. In this example, the meeting room class, the VIP guest class, and the lobby class have a configured minimum of 100 60, and 40 Mbps respectively. Over time, the bandwidth distribution change as demands in different classes change. Users can be assigned to the lobby class based on their location. In some embodiments, users can belong to both the lobby class based on their location the VIP guest class based on their status.

The control system 310 can assign these users characteristics of the lobby class, or the VIP class, or a combination of the characteristics.

Figure 10:
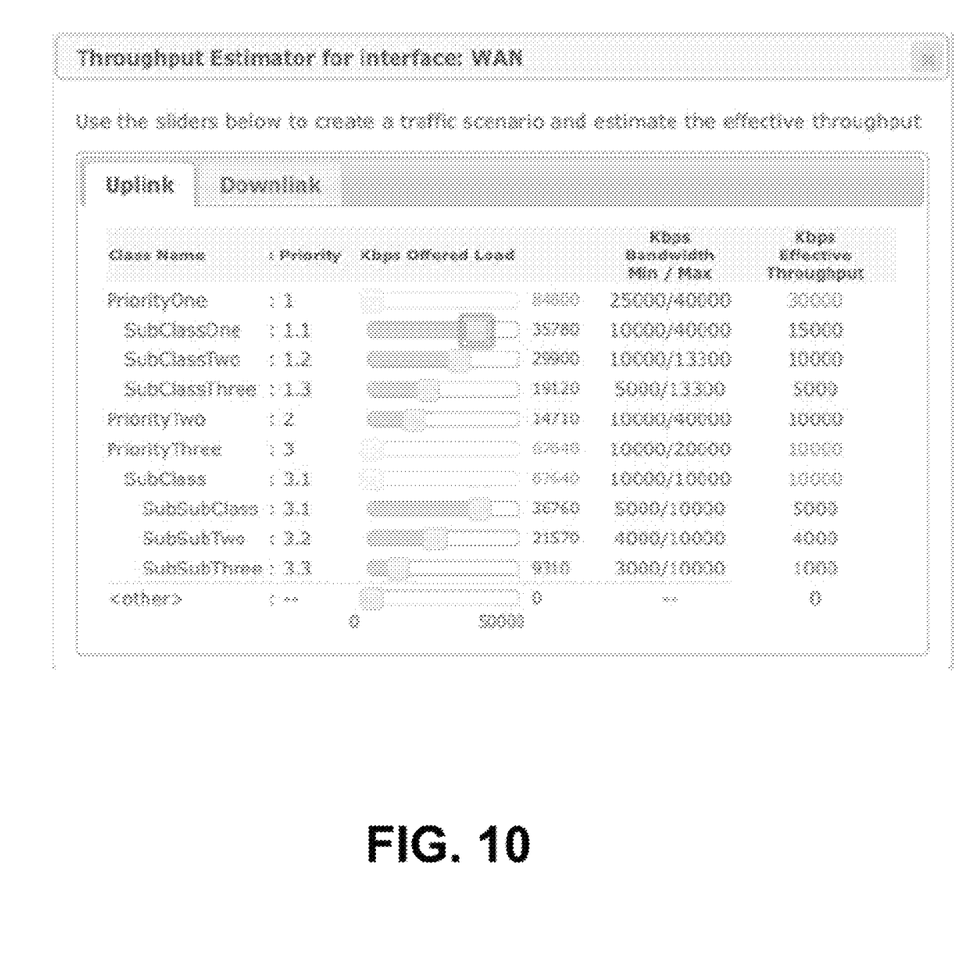
FIG. 10 illustrates a throughput estimator for a particular class hierarchical structure and simulated bandwidth usage.

FIG. 9 illustrates an embodiment of a user interface 900 for assigning a subscriber and their corresponding devices to a particular class. The control system 210 can also automatically change which class a user belongs to during operation. For example, a user may select to increase their bandwidth during connection by paying additional fees. The user may also move around the venue from meeting room to guest room. The control system 210 can detect changes in the user parameters and automatically change the user's classification during the access session. FIG. 10 illustrates a throughput estimator generated by the control system 210. Administrators can use the throughput estimator to simulate run time scenarios for various class structures. Accordingly, administrators can determine class configuration parameters and hierarchy for a particular network environment.

In some embodiments, the control system 210 manages link sharing on egress links, scheduling packets in such a way as to ensure that minimum, maximum and link sharing goals of all classes are met. The control system 210 can implement link sharing on top of bandwidth management features that operate on ingress links which shapes input traffic for either individual subscribers or groups (of subscribers) according to a bandwidth policy. To clarify the relationship between the bandwidth management feature and the link sharing feature consider the following example: Assume class A has a maximum uplink speed of 25 Mbs. Further assume 50 subscribers are assigned to this class and each of those subscribers has a bandwidth policy that specifies a maximum of 1 Mbs. Aggregate traffic from the subscribers will be shaped to a maximum of 50 Mbs by the Bandwidth Management feature (50×1 Mbs). Before being handed to the interface for transmission, the Link Share feature would further shape this aggregate to the maximum of the class or 25 Mbs.

Weighted Queueing (WQ)

As discussed above, when a group of classes have the same run time priority, the control system 210 can distribute bandwidth according to the configured parameters of the class. The control system 210 can determine a rate based on configured bandwidth parameters. In an embodiment, the rate is the configured minimum bandwidth of the class divided by the number of queues associated with that class. The rate can correspond to the weight since it includes configured minimum in the calculation. In an embodiment, each class can maintain 100 queues. Class can also maintain 1000 queues or 10000 queues or higher. The rate can correspond to allowance of data per time epoch for that class.

The control system 210 can maintain the current queue for each class in the memory. When a new packet arrives, the control system 210 can identify the class where the packet will go based on properties of a user or user device associated with the packet. The control system 210 can add the packet to the current queue or a later queue of the identified class. In some embodiments, the queues correspond to when the packet will be transmitted in the time. The control system 210 can maintain a counter for each class in the memory. When the new packet is queued, the control system 210 can subtract the length of the packet to be queued from the current counter value. If the counter is less than zero, the control system 210 determines that it cannot send the packet now. That is the class does not have an allowance. A class can get additional allowance over time. For example, the control system 210 can add allowance to the counter over predetermined time intervals. The control system 210 can also add allowance based usage changes. If the counter is greater than zero (that is there is allowance), the control system 210 can schedule the packet for transmission. For a counter of less than zero, the control system 210 can determine an offset. The offset can be calculates as follows: $1+(-1)*(counter/rate)$. The control system can queue the new packet into queue number that corresponds to current queue number+calculated offset modulo N (number of queues). The offset may correspond to how many time epochs later should the packet be sent.

For removing packets from the queue, the control system 210 can determine the current queue. If there is a packet in the current queue, the control system 210 can cause the network interface to transmit it. If no packets are available in the current queue, then the next queue is selected by the control system 210 by determining the (current queue+1) modulo N. In an embodiment, the control system 210 checks one of the following conditions before selecting the next queue. First, distribution of unallocated bandwidth is enabled or second, distribution of unallocated bandwidth is not enabled and the less than (1/N) seconds have passed since the current queue became the current queue. The numbers and time discussed above can vary according to system requirements. The control system 310 can repeat the determination of the packets in the current queue and moving on to the next queue as discussed above until either all queues have been examined, packet has been removed from the queue for transmission, or sufficient time has not yet passed to update the current queue.

Link Sharing Process

Figure 11:
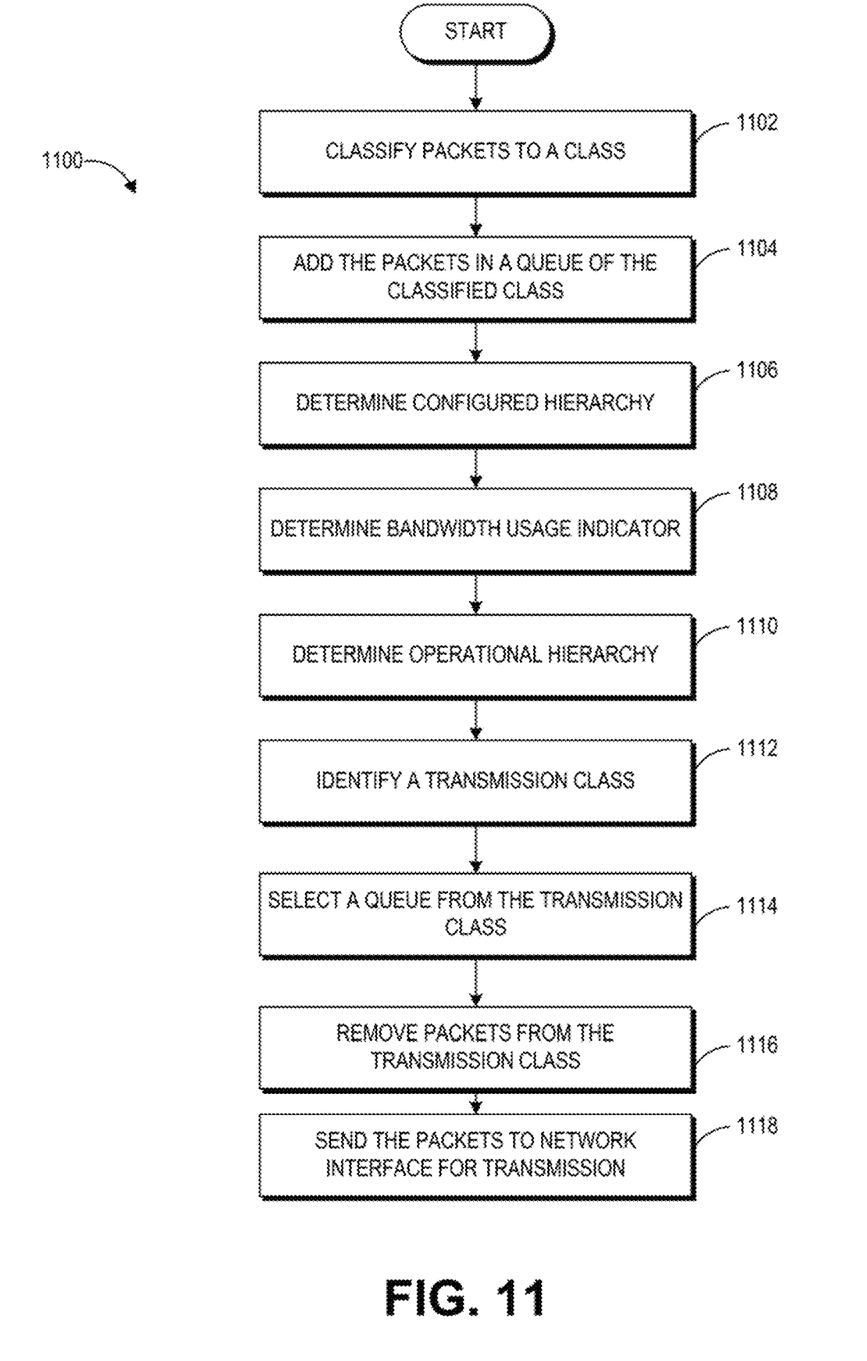
FIG. 11 illustrates an embodiment of a process for shaping output of network packets to manage bandwidth sharing among users.

FIG. 11 illustrates an embodiment of a process 1100 implemented using the systems described above. For example, the process 1100 can be implemented using the control system 210. As discussed above, when new packets are received at a network interface, the control system 210 can determine a class associated with the received packets at block 1102. Determination of class is discussed above. At block 1104, the control system 210 can add the received packet in a queue of the determined class. As discussed above, a class can have many queues. In an embodiment, the control system 210 adds the packet to the current queue of the class. The control system 210 can also add the packet to a later queue as discussed above with respect to weighted queueing. Traffic shaping can depend on where the control system 210 queues an incoming packet.

The control system 210 can also determine which packets to remove from one of the queues across all the classes. The control system 210 can continuously perform some or all of the functions of blocks 1106 to 1118. In some embodiments, the control system 210 can periodically perform some or all of the functions of blocks 1106 to 1118. The control system 210 can also perform some or all of the functions of blocks 1106 to 118 based on a trigger. The trigger can include receiving or transmitting a packet.

As discussed above, at block 1106, the control system 210 can determine configured hierarchy of the classes based on configuration parameters. Configured hierarchy may change with a change in configuration parameters. Accordingly, in some embodiments, the control system 210 may not need to perform block 1106 unless there is a change in the configuration parameters.

The control system 210 can also monitor bandwidth usage or throughput or connection speed for the classes to determine a usage indicator for each class at block 1108. Usage indicators may be identified as colors, as discussed above.

The control system 210 can use the configured hierarchy and the usage indicators to determine an operational hierarchy at block 1110. The operational hierarchy is dynamic and change with usage. Based on the operational hierarchy, the control system 210 can identify a class from which to select a packet for transmission at block 1112. In an embodiment, the control system 210 selects the class with the highest priority in the operational hierarchy.

The control system 210 can select a queue from the selected class for removing a packet for transmission at block 1114. The control system 210 can use the current queue of the selected class. In some embodiments, the control system 210 can use a different queue than the current queue if there are no packets in the current queue as discussed above.

The control system 210 can remove the packet from the queue and send it to a network interface for transmission at block 1116 and 1118 respectively. Removing the packet can change operational hierarchy.

Terminology

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

What is claimed is:

1. A network management system for shaping outgoing traffic of network packets, the network management system comprising:
 a network interface configured to receive a plurality of network packets associated with a plurality of user devices; and
 one or more hardware processors configured to:
  classify a first plurality of network packets of the plurality of network packets to a first class based on the first plurality of network packets being associated with a first attribute;
  classify a second plurality of network packets of the plurality of network packets to a second class based on the first plurality of network packets being associated with a second attribute different from the first attribute; and
  select one or more packets from the first plurality of network packets and the second plurality of network packets for transmission, such that at least some of the first plurality of network packets are prioritized over the second plurality of network packets,
 wherein the first class has a first absolute priority, a first usage-based priority, and a first minimum bandwidth, and the second class has a second absolute priority, a second usage-based priority, and a second minimum bandwidth.

2. The network management system of claim 1, wherein one or more computing devices are configured to be dynamically added to the first class or the second class.

3. The network management system of claim 1, wherein the first class has a first maximum bandwidth set at total available bandwidth, and the second class has a second maximum bandwidth set at total available bandwidth.

4. The network management system of claim 1, wherein the first attribute corresponds to a first user device of the plurality of user devices, and a second attribute corresponds to a second user device of the plurality of user devices different from the first user device.

5. The network management system of claim 1, wherein the first attribute corresponds to a first network traffic type, and a second attribute corresponds to a second network traffic type different from the first network traffic type.

6. The network management system of claim 1, wherein the one or more hardware processors are configured to ensure the second plurality of network packets are allocated the second minimum bandwidth based on the runtime hierarchical relationship between the first class and the second class.

7. The network management system of claim 1, wherein a sum of the first minimum bandwidth and the second minimum bandwidth is less than or equal to total available bandwidth.

8. The network management system of claim 1, wherein the one or more hardware processors are configured to select the one or more packets from the first plurality of network packets and the second plurality of network packets for transmission, such that (i) at least the first minimum bandwidth is provided to the first class, (ii) at least the second minimum bandwidth is provided to the second class, and (iii) a remaining amount of bandwidth is distributed across the first class and the second class according to a runtime hierarchical relationship between the first class and the second class based at least in part on (a) the first absolute priority of the first class, (b) the first usage-based priority of the first class, (c) the second absolute priority of the second class, and (d) the second usage-based priority of the second class.

9. The network management system of claim 8, wherein the remaining amount of bandwidth is distributed only to the first class based on the first absolute priority being higher than the second absolute priority.

10. The network management system of claim 8, wherein the remaining amount of bandwidth is distributed equally to the first class and the second class based on the first absolute priority being equal to the second absolute priority.

11. The network management system of claim 8, wherein the remaining amount of bandwidth is distributed only to the first class based on (a) the first usage-based priority being higher than the second usage-based priority and (b) the first absolute priority being the same as the second absolute priority.

12. The network management system of claim 8, wherein the remaining amount of bandwidth is distributed only to the first class based on (a) the first absolute priority being higher than the second absolute priority and (b) the first usage-based priority being the same as the second usage-based priority.

13. A network management method for shaping outgoing traffic of network packets, the network management method comprising:
receiving a plurality of network packets associated with a plurality of user devices;
classifying a first plurality of network packets of the plurality of network packets to a first class based on the first plurality of network packets being associated with a first attribute;
classifying a second plurality of network packets of the plurality of network packets to a second class based on the first plurality of network packets being associated with a second attribute different from the first attribute; and
selecting one or more packets from the first plurality of network packets and the second plurality of network packets for transmission, such that at least some of the first plurality of network packets are prioritized over the second plurality of network packets,
wherein the first class has a first absolute priority, a first usage-based priority, and a first minimum bandwidth, and the second class has a second absolute priority, a second usage-based priority, and a second minimum bandwidth.

14. The network management method of claim 13, further comprising ensuring the second plurality of network packets are allocated the second minimum bandwidth based on the runtime hierarchical relationship between the first class and the second class.

15. The network management method of claim 13, wherein a sum of the first minimum bandwidth and the second minimum bandwidth is less than or equal to total available bandwidth.

16. The network management method of claim 13, further comprising selecting the one or more packets from the first plurality of network packets and the second plurality of network packets for transmission, such that (i) at least the first minimum bandwidth is provided to the first class, (ii) at least the second minimum bandwidth is provided to the second class, and (iii) a remaining amount of bandwidth is distributed across the first class and the second class according to a runtime hierarchical relationship between the first class and the second class based at least in part on (a) the first absolute priority of the first class, (b) the first usage-based priority of the first class, (c) the second absolute priority of the second class, and (d) the second usage-based priority of the second class.

17. The network management method of claim 16, wherein the first attribute corresponds to a first user device of the plurality of user devices, and a second attribute corresponds to a second user device of the plurality of user devices different from the first user device.

18. The network management method of claim 16, wherein the first attribute corresponds to a first network traffic type, and a second attribute corresponds to a second network traffic type different from the first network traffic type.

* * * * *